May 3, 1938. K. H. SELIN 2,116,414
LAWN MOWER GRINDER
Filed May 22, 1937 2 Sheets-Sheet 1
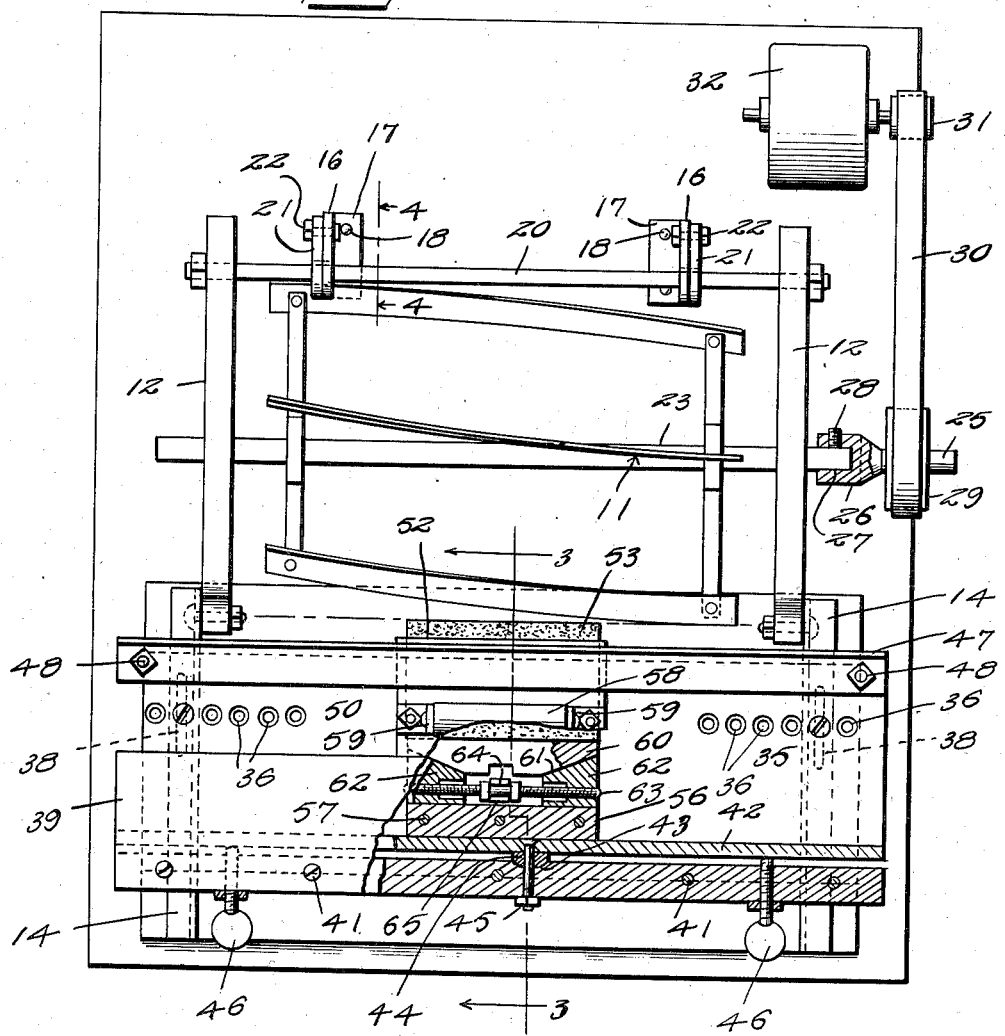
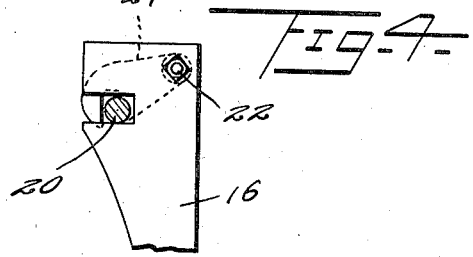
Inventor
K. H. Selin
By Watson E. Coleman
Attorney

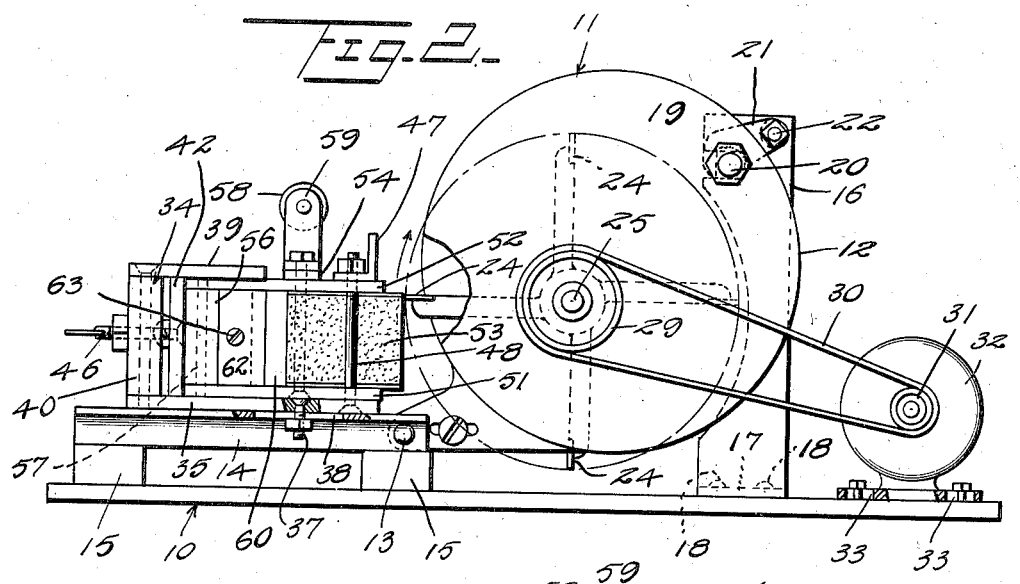

Patented May 3, 1938

2,116,414

UNITED STATES PATENT OFFICE 2,116,414

LAWN MOWER GRINDER

Karl H. Selin, Brooklyn, N. Y.

Application May 22, 1937, Serial No. 144,291

1 Claim. (Cl. 51—67)

This invention relates to lawn mower sharpening devices and more particularly to an improved means for sharpening the rotary blades of the mower.

An object of this invention is to provide a power driven means which is adapted to be connected to the rotary blades of a lawn mower and to provide a manually operable abrasive device in the form of a block of emery or the like and means for slidably supporting the emery in a position for engagement by the blades upon rotation thereof.

Another object of this invention is to provide a device of this kind which is so constructed that it can readily be used with lawn mowers having blades of different lengths and which can be accurately adjusted to grind the blades from end to end.

Another object of this invention is to provide in a device of this kind means whereby the abrasive may be adjusted relative to the carriage or slide so that there will be little waste in the abrasive as it is worn off by engagement with the rotary blades.

With the foregoing and other objects in view, the invention will be more fully described hereinafter, and will be more particularly pointed out in the claim appended thereto.

In the drawings, wherein like symbols refer to like or corresponding parts throughout the several views, Figure 1 is a top plan view partly broken away and in section of a lawn mower grinder constructed according to an embodiment of this invention;

Figure 2 is a detailed end elevation partly broken away and in section of the grinder;

Figure 3 is a sectional view taken on the line 3—3 of Figure 1;

Figure 4 is a fragmentary sectional view taken on the line 4—4 of Figure 1.

Referring to the drawings, the numeral 10 designates generally a base upon which a lawn mower generally designated as 11 is adapted to be secured. The lawn mower 11 preferably has the handle removed therefrom and also the roller and the end frame members 12 of the mower are adapted to be secured as by bolts 13 or the like to a pair of angle bars 14 which are mounted on a pair of rails or parallel bars 15 secured to the base 10. A pair of upright brackets 16 provided with right angular feet portions 17 are secured as by bolts 18 to the base 10 and are provided adjacent their upper ends with notches 19 in which the frame bar 20 of the mower is adapted to engage. A hook 21 is carried by each bracket 16 being mounted on a bolt 22 and this hook 21 is adapted to engage over the bar 20 and the bolt 22 tightened so as to firmly hold the frame bar 20 in the notch 19 of the bracket 16. In this manner, the lawn mower frame is firmly held on the base 10. The shaft 23 on which the blades 24 are mounted is adapted to have the usual gear means removed therefrom, and a coupling member in the form of a shaft 25 having an enlarged end 26 provided with a bore 27 is adapted to engage the projecting end of the shaft 23 and to be fastened thereon by means of a set screw 28. A pulley 29 is secured to the shaft 25 and a belt 30 is trained over the pulley 29 and also over a pulley 31 secured to the shaft of a motor or power member 32 which is fastened to the base 10. The motor 32 may be adjustably secured to the base 32 by providing elongated slots 33 in the base portion of the motor so that the belt 30 may be placed under the desired tension.

An adjustable guide member generally designated 34 is mounted on the angle bars 14 and comprises a lower plate 35 having a plurality of spaced apart holes 36 through which a bolt 37 is adapted to engage. The bolt 37 also extends through an elongated longitudinally extending slot 38 provided in each angle bar 14 so that the guide member 34 may be adjusted toward or away from the mower 11. An upper plate 39 is disposed in upwardly spaced relation to the lower plate 35 and a spacing bar 40 is interposed between the lower plate 35 and the upper plate 39 and a plurality of bolts 41 engage through the upper plate 39 and the bar 40 and into the lower plate 35 so as to hold the upper plate 39 in spaced parallel relation to the lower plate 35.

An adjustable guide rail 42 is disposed on the inside face of the bar 40 and the bar 40 provided at substantially a central point with a concave recess 43 in which a substantially semi-spherical washer 44 is adapted to engage. The washer 44 is provided with a central bore and the bar 43 has a hole axially of the recess 43 through which a bolt 45 is adapted to engage. The angular position of the guide rail 42 may be adjusted by means of a pair of rail adjusting bolts or screws 46 which are threaded through the rail 40 and contact with the confronting face of the guide rail 42. The central bolt 45 holds the guide rail 42 against longitudinal movement within the channel formed by the lower plate 35, the upper plate 39 and the back rail 40.

A guard rail 47 of angular construction is secured in upwardly spaced relation to the lower plate 35 by means of bolts 48 about which tubular sleeves or spacing members 49 are positioned so that the under face of the guard rail 47 will be disposed in parallel relation to the under face of the upper plate 39. The vertical side of the rail or guard member 47 is adapted to provide a means to prevent the fingers of a hand slipping forwardly and contacting with the rotating blades 24 of the motor.

A slidable sharpening member 50 is slidably disposed between the upper plate 39 and the lower plate 35 and between the guard rail 47 in the lower plate 35 and comprises a lower plate 51 and an upper plate 52 which are positioned on the lower and upper sides respectively of an abrasive or emery block 53. The plates 51 and 52 are provided adjacent the opposite ends thereof with holes through which bolts 54 engage and these bolts 54 also pass through a bar 55 which is adapted to be positioned between the confronting edges of the upper plate 39 and the guard rail 47.

A bar 56 is interposed between the plates 51 and 52 and is provided with a plurality of spaced apart holes through which dowel pins 57 engage. The pins 57 at their lower ends engage in the recesses provided in the lower plate 51 and at their upper ends engage in recesses provided in the upper plate 52 so that these dowel members 57 will hold the slide member 50 in assembled condition. A handle 58 is secured between a pair of L-shaped bracket members 59 which are secured by means of the bolts 54 to the bar 55 and the slide 50. The handle 58 is adapted to be grasped by a hand so that the slide 50 may be moved back and forth along the length of the guide member 34.

The emery block 53 may be adjusted with respect to the slide member 50 so as to provide a projecting portion of this block for contact with the blades 24 by means of a pressure bar 60 having tapered end portions 61 which are engaged by wedge members 62. The wedge members 62 are interposed between the spacing bar 56 and the pressure bar 60 and are each provided with a threaded bore in which a threaded adjusting member 63 is adapted to engage. Preferably the threads of the adjusting member 63 are of a right hand pitch adjacent one end and of a left hand pitch adjacent the other end so that the turning of this adjusting member 63 will move the wedge members 62 toward or away from each other. The central portion of the adjusting member 63 is provided with a flattened portion 64 which is adapted to engage between a forked member 65 which is threaded into the lower plate 51. In this manner, the threaded member 63 will be held in adjusted position.

In the use and operation of this device, the lawn mower 11 is adapted to have the roller supporting arms thereof secured by means of the bolts 13 to the lower angle bars 14. The belt 30 is trained over the pulley 29 which is fastened by means of the coupling comprising the shaft 25 and the sleeve 26 to the shaft 23. The bars 14 may be adjusted toward or away from each other to compensate for different sizes of lawn mowers by means of the spaced apart holes 36 provided in the lower plate 35. The relative position of the guide member 34 with respect to the blades 24 may be adjusted by means of the bolts 37 so that the emery block 53 will be moved in a parallel relation to the length of the shaft 23. After the initial adjustment is made of the guide member 34 by the bolts 37, a closer adjustment may be made by means of the adjusting bolts 46 which bear against the guide rail 42 so that this rail 42 may be so adjusted that the movement of the slide 50 will be in a plane parallel to the axis of the shaft 23. With the shaft 23 rotating and the blades 24 rotating therewith, the block 53 may be moved back and forth by grasping the handle 58 and moving the slide 50 longitudinally of the guide member 34.

It is, of course, understood that various changes and modifications may be made in the details of construction and design of the above specifically described embodiment of this invention without departing from the spirit thereof, such changes and modifications being restricted only by the scope of the following claim.

I claim:—

A lawn mower sharpening means comprising a base, means securing a lawn mower on the base, said means including a pair of parallel angle bars carried by said base, means securing the end frame portions of the mower to said angle bars, a pair of upstanding posts secured to said base and each provided with a slot to receive the transverse tie bar of said mower, means releasably locking said tie bar in said slots, a channelled guide member, means adjustably securing said channelled guide member on said angle bars, an elongated guide bar within said channelled guide member, means adjustably securing said guide bar in said guide member, a carriage engaging in said channelled guide member and slidably engaging said guide bar, adjustment of said guide bar adjusting the path of movement of said carriage in said guide member, an abrasive, and means engaging the carriage and abrasive adjustably securing the abrasive on said carriage.

KARL H. SELIN.